United States Patent [19]

Carkhuff

[11] Patent Number: 5,162,632
[45] Date of Patent: Nov. 10, 1992

[54] PLASMA TORCH HAVING HEAT SHIELD FOR TORCH BODY

[75] Inventor: Donald W. Carkhuff, Florence, S.C.

[73] Assignee: ESAB Welding Products, Inc., Florence, S.C.

[21] Appl. No.: 744,489

[22] Filed: Aug. 13, 1991

[51] Int. Cl.$^5$ .............................................. B23K 9/00
[52] U.S. Cl. ............................ 219/121.5; 219/121.51; 219/121.48; 219/121.49
[58] Field of Search ................... 219/136, 138, 137.43, 219/137.31, 121.48, 121.49, 121.5, 74, 75

[56] References Cited

U.S. PATENT DOCUMENTS

| | | | |
|---|---|---|---|
| 2,118,274 | 5/1938 | Sweda | 219/137.43 |
| 2,132,570 | 10/1938 | Leone | 219/137.43 |
| 2,411,980 | 12/1946 | Ringwald | 219/130 |
| 2,412,492 | 12/1946 | Brazitis | 219/137 |
| 2,477,207 | 7/1949 | Rinehart | 219/130 |
| 2,681,969 | 6/1954 | Burke | 219/8 |
| 2,903,568 | 9/1959 | Wells | 219/138 |
| 3,172,992 | 3/1965 | Keller | 219/130 |
| 3,582,606 | 6/1971 | Henriksen et al. | 219/130 |
| 4,128,754 | 12/1978 | Rathjen, Jr. | 219/76.16 |
| 4,306,137 | 12/1981 | Shoup et al. | 219/121.5 |
| 4,493,970 | 1/1985 | Rieppel et al. | 219/137.41 |
| 4,771,158 | 9/1988 | Kleppen | 219/121.5 |
| 5,013,885 | 5/1991 | Carkhuff et al. | 219/121.5 |

Primary Examiner—Mark H. Paschall
Attorney, Agent, or Firm—Bell, Seltzer, Park & Gibson

[57] ABSTRACT

A plasma cutting and gouging torch has a torch body and a torch head that defines a longitudinal axis. A nozzle is aligned with the longitudinal axis and is secured to the torch head at the plasma discharge end for discharging plasma through the nozzle outlet and onto a workpiece. A handle is secured onto the head and extends outward from the torch head. A shield is secured to the torch head and extends substantially around the periphery of the torch head opposite the handle and extends along the surface of the handle confronting toward the nozzle. The shield extends in close, spaced relation to the torch head and handle to define a narrow, insulating air gap between the torch body and the shield. A flow of air may be introduced into the formed air gap to aid in cooling the torch body during cutting or gouging.

23 Claims, 2 Drawing Sheets

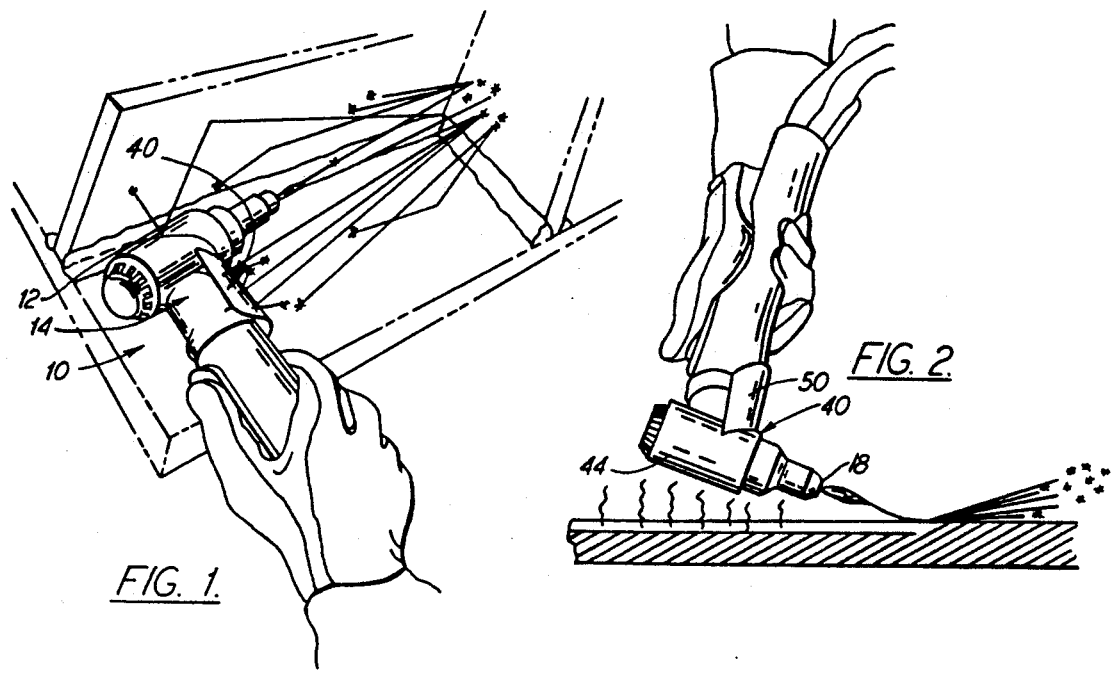
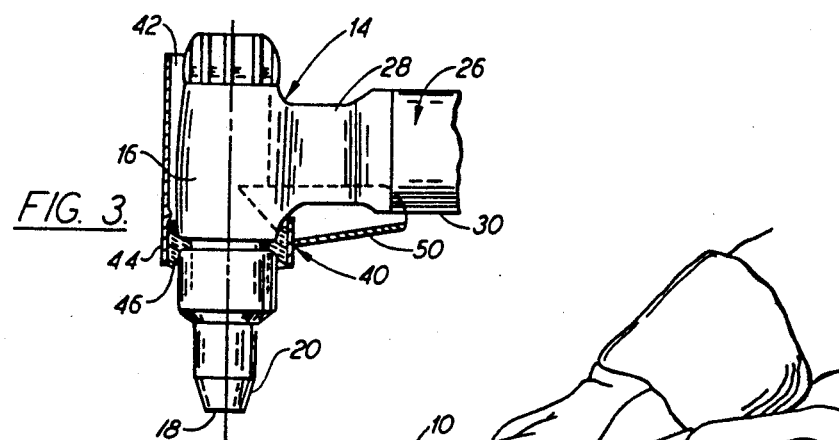
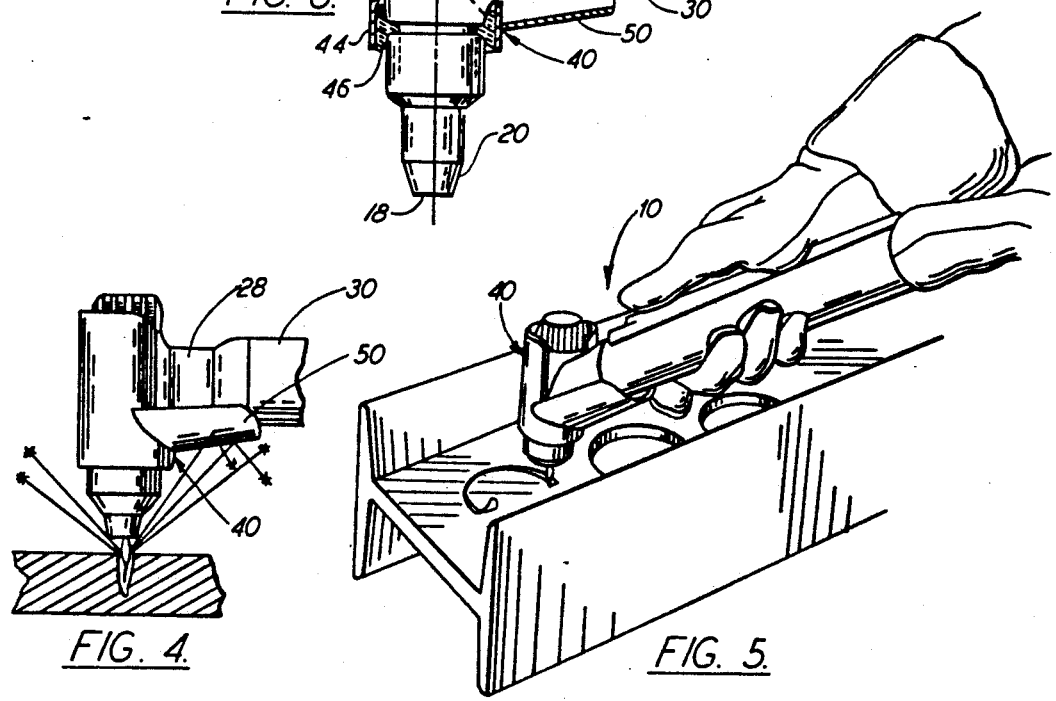

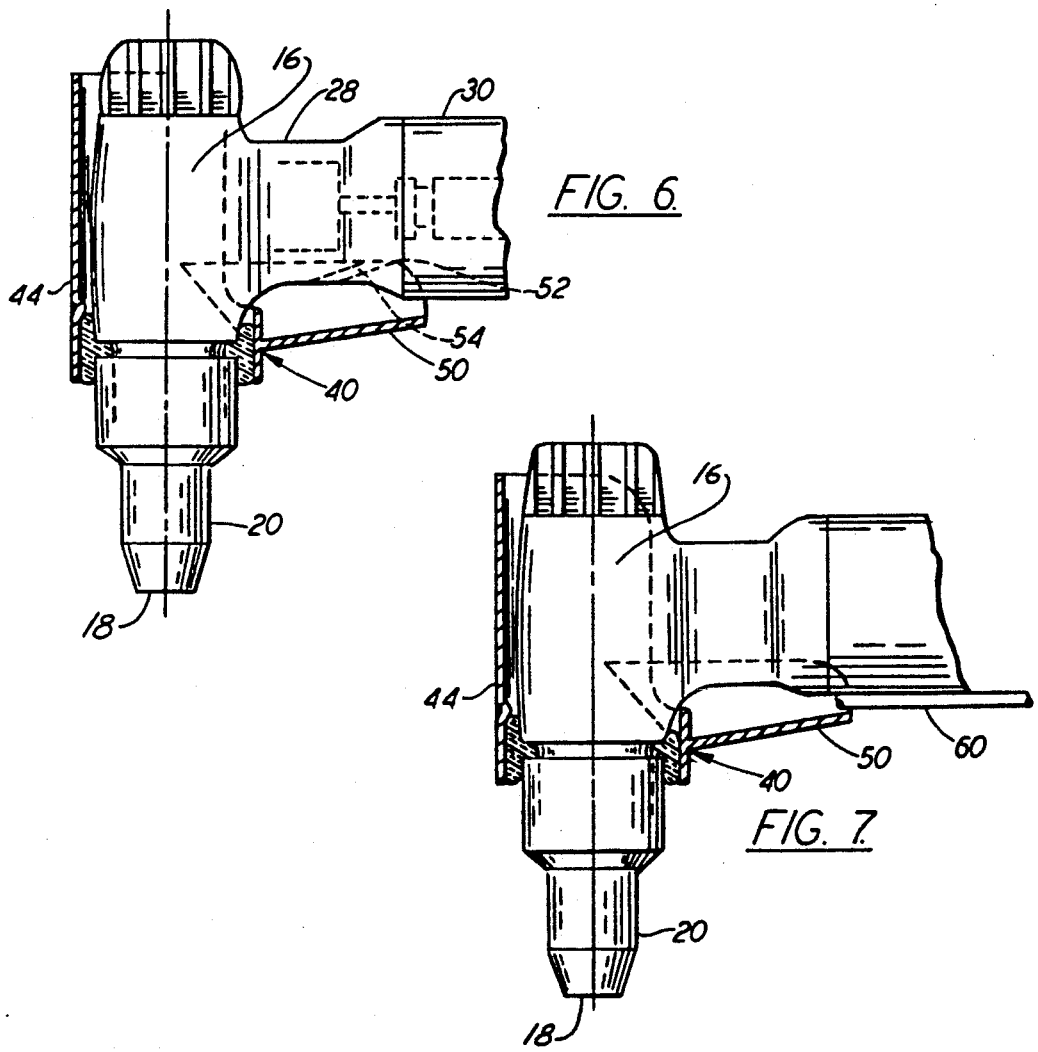

PLASMA TORCH HAVING HEAT SHIELD FOR TORCH BODY

FIELD OF THE INVENTION

This invention relates to a plasma torch having a heat shield for protecting the torch body during cutting or gouging operations.

BACKGROUND OF THE INVENTION

Some plasma torch metal working operations require that the torch body remain close to hot metallic surfaces for prolonged periods of time. For example, in a gouging or cutting operation, the surface of the workpiece is raised to as high as 2000° Fahrenheit. The nozzle positioned on the front end of the torch often is positioned only a fraction of an inch from the red-hot workpiece. As a result, the intense heat generated during cutting and gouging often degrades the torch body resulting in premature failure of the machined, high tolerance components of the torch.

Some torch designs have the torch body formed from a molded polymer material, such as phenolic resin, that encases the machined, high tolerance components of the torch. The phenolic resin provides some protection from the high heat and resists degradation and concomitant failure of the torch components. Over time, however, these heat-resistant resins degrade when the torches are used in cutting or gouging operations in which the nozzle is placed in close proximity to the hot metal workpiece.

Some prior art welding apparatus include flat, sheet metal shields secured onto electrode holders for protecting both the torch and the operator's hand from the heat generated during welding. These shields often are dimensioned large enough to provide some protection to the electrode holder and operator's hand. However, the shields do not provide protection if the electrode holder is positioned to within a fraction of an inch of a red hot workpiece. Thus, the shields are not advantageous for use with plasma torches. The prior art shields are not designed, nor configured to withstand the high heat imparted onto a torch body that is positioned to within fractions of an inch of a workpiece during metal cutting and gouging operations.

Additionally, the above prior art shields are large and unwieldy, and often make the particular metal working operation difficult because of the unwieldy nature of the shield. Also, the prior art shields often are secured to the electrode holder in a position that allows a user to view the work without having visual interference from the shield. As a result of this shield positioning, heat and splatter emitted from the hot workpiece during welding often engages the front portion of the holder resulting in its degradation if the holder is positioned close to the workpiece. Because the shields are substantially flat and do not extend in close proximity to the electrode holder, the shields do not provide for any insulating air gap between the shield and electrode holder.

SUMMARY OF THE INVENTION

It is therefore an object of the present invention to provide a plasma torch having a shield for protecting the torch body from the heat, splatter and molten metal generated during cutting or gouging.

It is another object of the present invention to provide a plasma torch having a shield for protecting the torch head and the underside surface of the handle portion confronting toward the nozzle during cutting or gouging.

It is still another object of the present invention to provide a plasma torch having a shield that extends in close, spaced relation to the head and handle portion of the torch to define a narrow insulating air gap between the torch body and the shield during cutting or gouging.

It is still another object of the present invention to provide a plasma torch having a shield that extends in close, spaced relation to the head and handle portion of the torch to define a narrow, insulating air gap between the torch body and the shield and which includes means for introducing a flow of air into the gap formed between the shield and the torch body to maintain the torch body cool during torch operation.

It is still another object of the present invention to provide a plasma torch having a heat-resistant shield for protecting the torch head and the surface of the handle confronting the nozzle of the torch head and which is formed of a polished metal for reflecting incoming heat radiation during torch operation.

It is still another object of the present invention to provide a heat-resistant shield for a plasma torch which protects the torch head and the surface of the handle confronting the nozzle of the torch head.

In accordance with the present invention, the plasma torch comprises a torch body having a torch head defining a longitudinal axis and including a plasma discharge end. The torch head has an outer surface formed of a molded polymer resin. A nozzle is aligned with the longitudinal axis and is secured to the torch head at the plasma discharge end for discharging plasma through the nozzle and onto a workpiece. A handle is secured to the torch head and extends outward from the torch head at an angle to the longitudinal axis.

A shield is secured to the head and extends in substantially close, spaced relation to the periphery of the torch head and close along the surface of the handle confronting the nozzle to define a narrow, insulating air gap between the torch body and the shield so that the torch body is protected from the heat and splatter generated during cutting or gouging of a workpiece.

A flow of air may be introduced into the air gap for cooling the torch body during cutting or gouging. In one embodiment, an air channel extends within the torch body and an air vent is positioned on the torch body within the air gap and communicates with the air channel for allowing the gas flowing within the air channel to be vented into the air gap. In another embodiment, an air hose extends along the torch body and includes a discharge end positioned within the air gap for injecting a flow of air into the air gap.

Preferably, the shield is formed of a polished metal for reflecting incoming heat radiation during cutting or gouging of a workpiece. The shield follows substantially equidistantly the periphery of the torch head so that the dimensions of the air gap formed between the shield and the torch head is approximately equal along the length thereof. A heat-resistant insulator secures the shield to the torch head at the plasma discharge end and adjacent the nozzle. The heat-resistant insulator extends around the periphery of the lower portion of the head for preventing heat and splatter from entering into the formed air gap between the shield and torch body during cutting and gouging of the workpiece.

BRIEF DESCRIPTION OF THE DRAWINGS

Some of the objects and advantages of the present invention having been stated, others will appear as the description proceeds, when taken in conjunction with the accompanying drawings in which:

FIG. 1 is an isometric view of a first embodiment of the plasma torch in accordance with the present invention showing a gouging operation and the shield protecting the torch body from the generated heat and splatter;

FIG. 2 is a side view of a gouging operation showing the shield protecting the torch body from the heat generated at the workpiece;

FIG. 3 is a side view of the plasma torch showing in detail the heat-resistant insulator securing the shield to the torch body;

FIG. 4 is a side view of the plasma torch during a piercing and cutting operation and showing the splatter generated during piercing reflecting off the shield;

FIG. 5 is an isometric view of a cutting operation with the torch of the present invention;

FIG. 6 is a side view of a second embodiment of the torch and showing an air channel extending within the torch body and an air vent positioned within the torch body within the air gap and communicating with the air channel for allowing the gas flowing within the air channel to be vented into the air gap; and FIG. 7 is a side view of a third embodiment of the torch and showing an air hose extending along the torch body and including an air hose end positioned within the air gap for injecting a flow of air into the air gap.

DETAILED DESCRIPTION OF THE PREFERRED EMBODIMENTS

Referring now to the drawings, and more particularly to FIGS. 1 through 3, there is disclosed a plasma torch 10 in accordance with the present invention having a heat-resistant shield secured thereto for protecting the torch body from heat and splatter generated during cutting or gouging of a work piece. As shown in greater detail in FIG. 3, the torch is a conventional plasma torch used in metal working operations such as the cutting and gouging of a workpiece. The illustrated torch is similar to a conventional torch manufactured and sold by ESAB Welding Products, Inc. of Florence, S.C., the assignee of the present patent application, and sold under the PT series of torches.

The torch body, indicated generally at 14, includes a torch head of substantially cylindrical configuration and which defines a longitudinal axis along the body of the torch (FIG. 3). The torch head 16 has an outlet 18 at a plasma discharge end and a nozzle 20 aligned with the longitudinal axis and secured to the torch head at the plasma discharge end for discharging plasma through the nozzle and onto a workpiece. The outer surface of the torch head is formed of a molded polymer resin and encases the machined components of the torch within the torch body.

As is conventional with this type of torch, an electrode (not shown) is mounted in the torch head along the longitudinal axis and includes a plasma discharge end extending forwardly to the plasma discharge end of the torch body 14. The nozzle 20 surrounds in spaced relation the discharge end of an electrode (not shown) to define an annular gas passageway between the electrode and nozzle 20. As is conventional, a first gas flow is supplied into the formed annular gas passageway for generating a plasma and a second gas flow is supplied into surrounding engagement with the plasma.

The handle, indicated generally at 26, of the torch body is secured to the torch head 16 substantially opposite the plasma discharge end. The handle 26 extends outward from the head 16 substantially transverse to the longitudinal axis to define a substantially L configured torch body. The handle 26 includes the conventional gas supply lines for supplying gas to the annular gas passageways and conventional electrical supply lines for supplying power to the electrode for forming an arc between the electrode and the workpiece. The handle preferably is formed of a heat-resistant material. The illustrated embodiment includes a first handle portion 28 integrally formed with the head 16 and a second hollow handle portion 30 threaded onto the first portion.

In accordance with the present invention, a heat-resistant shield 40 is secured to the torch head 16 and extends substantially circumferentially in close, spaced relation to the cylindrical periphery of the torch head 16 and close along the surface of the handle 26 confronting toward the nozzle to define a narrow air gap 42 between the torch body and the shield (FIG. 3). In the illustrated embodiment, the shield 40 is formed from two separate members secured to each other. The first shield member 44 is secured to the head 16 adjacent the nozzle 20. The first member 44 includes a lower cylindrical portion extending substantially circumferentially in close, spaced relation to the cylindrical periphery of the lower portion of the torch head 16. A vertically extending, arcuate shield portion extends along the surface of the torch head opposing the torch handle. The vertically extending shield portion extends in close, spaced relation to the torch head.

A heat-resistant insulator 46 secures the first shield member 44 to the torch head at the plasma discharge end and adjacent the nozzle. The insulator 46 extends around the periphery of the lower portion of the head 16 for preventing heat and splatter from entering into the formed air gap 42 between the shield 40 and torch body during cutting or gouging of the workpiece. The insulator can be formed of a ceramic material, glass filled thermosetting material such as epoxy, or other similar material. In one embodiment, the insulator is connected to the shield 40 before the shield is secured onto the torch. When the insulator is secured onto the shield, the nozzle may be inserted into the opening defined by the insulator and secured into that position by a force fit, engagement with ribs formed on the torch body or on the insulator, or other means.

Alternatively, the torch head 16 may be formed with ribs (not shown) that engage the shield 40. The shield extends vertically upward in close, spaced relation to the cylindrical periphery of the torch head 16 opposite the handle 26 and substantially equidistant to the periphery of the torch head 16 so that dimensions of the air gap 42 formed between the shield 40 and the torch head are approximately equal along its length.

A second shield member 50 is secured onto the lower portion of the first member 44 and extends along the surface of the handle confronting toward the nozzle. The second shield member 50 extends along the handle a distance sufficient to protect the handle portion adjacent the torch head 16 from the heat and splatter generated during cutting and gouging operations. The second member 30 also forms an air gap 42 between the handle and shield. As shown in FIG. 3, the air gap 42 formed between the second shield member 50 and the torch body is greater than the air gap 42 between the torch head 16 and the first shield member 44; however, the air gap formed between the second shield member 50 and the handle provides a sufficient insulating air space between the shield and handle. Preferably, the formed air gap around the torch head between the first member 44 and the torch head is between about 0.050 and 0.200 inches.

Preferably, the shield 40 is formed of a heat-resistant, polished metal for reflecting the incoming heat radiation during cutting or gouging of the workpiece. A variety of different metals can be used for the shield. Nickel or chrome-plated steel has been found to be advantageous as a metal for reflecting the incoming heat.

A second embodiment of the present invention is illustrated in FIG. 6 in which the flow of gas is introduced into the air gap 42 formed between the shield and torch body. As illustrated, means for introducing a flow of air into the air gap 42 includes an air channel 52 extending within the handle 26. An air vent 54 is positioned on the torch body defined within the air gap 42 and communicates with the air channel 52 for allowing the gas flowing within the air channel 52 to be vented into the air gap. As illustrated, the vent is angled toward the torch head so that as air flows through the torch handle, it is directed through the angled vent toward the torch head 16.

In another embodiment, illustrated in FIG. 7, an air hose 60 extends along torch body 14 and includes an air discharge end positioned within the air gap 42 for injecting a flow of air into the air gap. The air hose allows easy retrofit of existing torches because it can be secured onto the outside portion of the handle or other portions of the torch.

As illustrated in the drawings, the shield 40 of the present invention not only provides for an insulating air gap between the shield 40 and torch body 14, but the shield also protects the torch body from heat and splatter generated during metal working operations such as cutting and gouging. As shown in FIG. 1, in which the torch is used in a gouging operation in a confined area, the splatter and metal particles generated during gouging are reflected off the shield 40. In FIG. 2, there is illustrated a cutting and gouging operating in which the plasma torch 10 is inverted and the torch head trails during gouging and cutting. The shield 40 protects the plasma torch from the heat radiating from the workpiece. In FIG. 4, the plasma torch is piercing a workpiece. The shield 40 also protects the plasma torch from splatter generated during piercing.

Because the shield 40 extends substantially coextensive to the torch body in close, spaced relation to the head and handle portion, the shield does not interfere with normal cutting operations in confined areas (FIG. 5). Thus, the shield does not add bulk to the torch or interfere with the operator's view of the workpiece during cutting and gouging. Additionally, as shown in the second and third embodiments of FIGS. 6 and 7, the air introduced in the air gap 42 provides additional cooling to the torch head and provides an additional insulating effect greater than the natural insulating effect resulting from the formed air gap between the shield and torch body.

In the drawings and specification, there has been set forth preferred embodiments of the invention, and although specific terms are employed, they are used in a generic and descriptive sense only, and not for purposes of limitation.

That which is claimed is:

1. A plasma torch comprising a torch body and including a torch head defining a longitudinal axis and having a plasma discharge end, a nozzle aligned with the longitudinal axis and secured to said torch head at the plasma discharge end for discharging plasma through the nozzle and onto a workpiece, and a handle secured to the torch head and extending outward from the torch head at an angle to the longitudinal axis; and a shield secured to said torch body and including a cylindrical portion extending about the portion of said torch head adjacent said plasma discharge end, a longitudinally extending arcuate portion extending substantially around the periphery of the torch head opposite said handle, and a handle portion extending along the surface of said handle confronting toward said nozzle, said shield extending in close, spaced relation to said head and handle to define a narrow, insulating air gap between said torch body and shield wherein said shield protects the torch body from heat and splatter generated during cutting or gouging of a workpiece.

2. A plasma torch according to claim 1 including a heat-resistant insulator securing said shield to said torch head at said plasma discharge end, and wherein said heat-resistant insulator forms a seal along the periphery of said torch head for preventing heat and splatter from entering into the formed air gap between the shield and torch body during cutting or gouging of a workpiece.

3. A plasma torch according to claim 1 wherein said shield is formed of a heat-resistant, polished metal for reflecting incoming heat radiation during cutting or gouging of a workpiece.

4. A plasma torch according to claim 1 including means for introducing a flow of gas into the insulating air gap formed between the shield and the torch body.

5. A plasma torch according to claim 1 wherein said shield is spaced substantially equidistantly along the periphery of said torch head so that the spacing of the air gap adjacent the torch head is substantially the same along the length of the torch head.

6. A torch according to claim 5 wherein the spacing of the air gap is between about 0.050 and 0.200 inches.

7. A plasma torch comprising a torch body and including a torch head defining a longitudinal axis and having a plasma discharge end, a nozzle aligned with the longitudinal axis and secured to said torch head at the plasma discharge end for discharging plasma through the nozzle and onto a workpiece, a handle portion secured to the torch head and extending outward from the torch head at an angle to the longitudinal axis; a shield extending substantially around the periphery of the torch head opposite said handle and along the surface of said handle confronting toward said nozzle, said shield extending substantially coextensive to said torch body in close, spaced relation to said head and handle to define a narrow, insulating air gap between said shield and torch body and wherein said shield protects said torch body from the heat and splatter generated during cutting or gouging of a workpiece; and means for introducing a flow of a gas into the air gap between said shield and said torch body for cooling the torch head during cutting or gouging, and a heat-resistant insulator securing said shield to said torch head at said plasma discharge end, and wherein said heat-resistant insulator forms a seal around the periphery of said torch head for preventing heat and splatter from entering into the formed air gap between the shield and torch body during cutting or gouging of a workpiece.

8. A torch according to claim 7 wherein said means for introducing a flow of gas into the air gap includes a gas channel extending within said torch body, and a vent positioned on said torch body within said air gap and communicating with said gas channel for allowing the gas flowing within said gas channel to be vented into the air gap.

9. A torch according to claim 7 wherein said means for introducing a flow of gas into the air gap includes a hose extending along said torch body and having a hose end positioned within said air gap for injecting a flow of a gas into the air gap.

10. A torch according to claim 7 wherein said heat-resistant shield is formed of a polished metal for reflecting incoming heat radiation during cutting or gouging of a workpiece.

11. A torch according to claim 7 wherein said shield is spaced substantially equidistantly along the periphery of said torch head so that the spacing of the air gap adjacent the torch head is substantially the same along the length of the torch head.

12. A torch according to claim 7 wherein the spacing of the air gap adjacent the torch head is between about 0.050 and 0.200 inches.

13. A plasma torch comprising a torch body and including a torch head of substantially cylindrical configuration an defining a longitudinal axis and having a plasma discharge end, said torch head having an outer surface formed of a molded polymer resin, a nozzle aligned with the longitudinal axis and secured to said torch head at the plasma discharge end for discharging plasma through the nozzle and onto a workpiece, a handle secured to the torch head generally opposite the plasma discharge end and extending outward from the head substantially transverse to the longitudinal axis to define a substantially L configured torch body; a shield secured to said torch head and extending substantially circumferentially in close, spaced relation to the cylindrical periphery of the torch head and close along the surface of said handle confronting toward said nozzle to define a narrow, insulating air gap between said torch body and wherein said shield protects the torch body from heat and splatter generated during cutting or gouging of a workpiece, and heat-resistant insulator securing said shield to said torch head at said plasma discharge end, and wherein said heat-resistant insulator forms a seal along the periphery of said torch head for preventing heat and splatter from entering into the formed air gap between the shield and torch body during cutting or gouging of a workpiece.

14. A torch according to claim 13 including means for introducing a flow of air into the air gap for cooling the torch body during cutting or gouging.

15. A torch according to claim 14 wherein said means for introducing a flow of air into the air gap includes an air channel extending within said torch body, and an air vent positioned on said torch body within said air gap and communicating with said air channel for allowing the gas flowing within said air channel to be vented into the air gap.

16. A torch according to claim 14 wherein said means for introducing a flow of air into the air gap includes an air hose extending along said torch body and including an air hose end positioned within said air gap for injecting a flow of air into the air gap.

17. A torch according to claim 13 wherein said shield formed of a polished heat-resistant metal for reflecting incoming heat radiation during cutting or gouging of a workpiece.

18. A torch according to claim 13 wherein said shield is spaced substantially equidistantly along the periphery of said torch head so that the spacing of the air gap adjacent the torch head is substantially the same along the length of the torch head.

19. A torch according to claim 13 wherein the spacing of the air gap is between about 0.050 and 0.200 inches.

20. A shield adapted for use with a plasma torch to protect the torch body from heat and splatter generated during cutting or gouging of a workpiece, the torch body having a torch head and a torch handle extending outward from the torch head, and comprising a first shield member having a cylindrical portion adapted to extend substantially circumferentially in close, spaced relation to the lower portion of the torch head, and a longitudinally extending arcuate shield portion extending from the cylindrical portion and parallel to the central axis of the cylindrical portion, and wherein the arcuate shield portion is configured so that the shield extends in close, spaced relation to the surface of the torch head opposite the torch handle; and a second shield member connected to the first shield member and extending outward therefrom at an angle so as to extend along the surface of a torch handle confronting toward the nozzle when the shield is positioned on a torch.

21. A shield according to claim 20 wherein the shield is formed of a heat-resistant, polished metal for reflecting incoming heat radiation during cutting or gouging of a workpiece.

22. A plasma torch comprising a torch body and including a torch head defining a longitudinal axis and having a plasma discharge end, a nozzle aligned with the longitudinal axis and secured to said torch head at the plasma discharge end for discharging plasma through the nozzle and onto a workpiece, a handle portion secured to the torch head and extending outward from the torch head at an angle to the longitudinal axis; a shield extending substantially around the periphery of the torch head opposite said handle and along the surface of said handle confronting toward said nozzle, said shield extending substantially coextensive to said torch body in close, spaced relation to said head and handle to define a narrow, insulating air gap between said shield and torch body and wherein said shield protects said torch body from the heat and splatter generated during cutting or gouging of a workpiece; and means for introducing a flow of gas into the air gap between said shield and said torch body for cooling the torch head during cutting or gouging, said means for introducing a flow of gas into the air gap including a gas channel extending within said torch body, and a vent positioned on said torch body within said air gap and communicating with said gas channel for allowing the gas flowing within said gas channel to be vented into the air gap.

23. A plasma torch comprising a torch body and including a torch head defining a longitudinal axis and having a plasma discharge end, a nozzle aligned with the longitudinal axis and secured to said torch head at the plasma discharge end for discharging plasma through the nozzle and onto a workpiece, a handle portion secured to the torch head and extending outward from the torch head at an angle to the longitudinal axis; a shield extending substantially around the periphery of the torch head opposite said handle and along the surface of said handle confronting toward said nozzle, said shield extending substantially coextensive to said torch body in close, spaced relation to said head and handle to define a narrow, insulating air gap between said shield and torch body and wherein said shield protects said torch body from the heat and splatter generated during cutting or gouging of a workpiece; and means for introducing a flow of gas into the air gap between said shield and said torch body for cooling the torch head during cutting or gouging, said means for introducing a flow of gas into the air gap including a hose extending along said torch body and having a hose end positioned within said air gap for injecting a flow of a gas into the air gap.

* * * * *

UNITED STATES PATENT AND TRADEMARK OFFICE
CERTIFICATE OF CORRECTION

PATENT NO. : 5,162,632
DATED : November 10, 1992
INVENTOR(S) : Donald W. Carkhuff It is certified that error appears in the above-identified patent and that said Letters Patent is hereby corrected as shown below:

Column 7, line 29, delete "an" and insert -- and --.

Column 8, line 2, before "formed" insert -- is --.

Signed and Sealed this

Twelfth Day of October, 1993

Attest:

BRUCE LEHMAN

Attesting Officer      Commissioner of Patents and Trademarks